United States Patent
Lin

(10) Patent No.: US 8,667,229 B2
(45) Date of Patent: Mar. 4, 2014

(54) DATA ACCESS METHOD OF A MEMORY DEVICE

(75) Inventor: Jen-Wen Lin, Kaohsiung (TW)

(73) Assignee: Silicon Motion, Inc., Jhubei, Hsinchu County (TW)

( * ) Notice: Subject to any disclaimer, the term of this patent is extended or adjusted under 35 U.S.C. 154(b) by 1010 days.

(21) Appl. No.: 12/748,527

(22) Filed: Mar. 29, 2010

(65) Prior Publication Data

US 2011/0078365 A1    Mar. 31, 2011

(30) Foreign Application Priority Data

Sep. 29, 2009 (TW) .............................. 98132891 A

(51) Int. Cl.
*G06F 13/16* (2006.01)
(52) U.S. Cl.
USPC ........... 711/150; 711/147; 711/151; 711/202; 710/52
(58) Field of Classification Search
USPC ................ 711/150, 151, 147, 202; 710/52
See application file for complete search history.

(56) References Cited

U.S. PATENT DOCUMENTS

| | | | |
|---|---|---|---|
| 2002/0144078 A1* | 10/2002 | Topham et al. | 711/203 |
| 2003/0041190 A1 | 2/2003 | Kolli | |
| 2003/0217224 A1* | 11/2003 | Watts | 711/105 |

* cited by examiner

*Primary Examiner* — Jae Yu
(74) *Attorney, Agent, or Firm* — McClure, Qualey & Rodack, LLP

(57) ABSTRACT

The invention provides a data access method of a memory device. In one embodiment, the memory device comprises a plurality of memories. First, a plurality of commands sequentially received from a host is stored in a command queue. A target command is then retrieved from the command queue. A target memory accessed by the target command is then determined. Whether the target memory is in a busy state is then determined. When the target memory is not in a busy state, access operations requested by the target command are then performed. When the target memory is in a busy state, a substitute command is selected from a plurality of subsequent commands stored in the command queue and access operations requested by the substitute command are performed, wherein the sequence of the subsequent commands in the command queue is subsequent to the target command.

11 Claims, 5 Drawing Sheets

400

| Command sequence | Access command | Starting logical address | Length of data | Logical address range | Accessed memory |
|---|---|---|---|---|---|
| 1 | Read command | 1001 | 1000 | 1001~2000 | First memory |
| 2 | Write command | 7501 | 1500 | 7501~9000 | Second memory |
| 3 | Read command | 10001 | 1000 | 10001~11000 | Third memory |
| 4 | Write command | 9001 | 1500 | 9001~10500 | Second memory |
| 5 | Read command | 17501 | 1500 | 17501~19000 | Fourth memory |
| ... | ... | ... | ... | ... | ... |
| K | | | | | |

FIG. 4

DATA ACCESS METHOD OF A MEMORY DEVICE

CROSS REFERENCE TO RELATED APPLICATIONS

This Application claims priority of Taiwan Patent Application No. 98132891, filed on Sep. 29, 2009, the entirety of which is incorporated by reference herein.

BACKGROUND OF THE INVENTION

1. Field of the Invention

The invention relates to data access of memories, and more particularly to data access of flash memories.

2. Description of the Related Art

A flash memory is usually installed in a data storage device for data storage. To provide a data storage device with a greater data capacity, the data storage device usually comprises a plurality of flash memories. A controller of the data storage device therefore must manage data access of a plurality of flash memories. When the data storage device receives a series of access commands from a host, the controller must determine which flash memory to access by the access commands, and then sends the access commands to the corresponding flash memory, thus performing the operations requested by the access commands.

Referring to FIG. 1, a flowchart of a conventional data access method 100 for a controller of a flash memory device is shown. The controller first receives an access command from a host (step 102). The controller then determines a target memory accessed by the access command (step 104). Because the target memory may be busy, processing data previously received from the controller or integrating or moving data stored therein, it may be in a busy state, thereby preventing it from receiving new data from the controller. After the target memory is determined, the controller therefore must determine whether the target memory is in a busy state (step 106). When the target memory is in a busy state, the controller must wait for a predetermined period. After the predetermined period has passed, the controller then determines again whether the target memory is still in a busy state (step 106). A loop is recursively performed until the target memory is determined to not be in a busy state.

When the controller determines that the target memory is not in a busy state (step 106), the target memory can receive new data and new access commands from the controller. Thus, the controller therefore sends an access command to the target memory to access data stored in the target memory (step 110). The access command may be a read command requesting that the target memory reads data therefrom or a write command requesting that the target memory writes data thereto. After the access command is executed, the controller then reports a data access result to the host (step 112). Finally, if the host sends another access command to the flash memory device (step 114), the controller performs steps 102~112 again.

The conventional data access method 100 shown in FIG. 1 has shortcomings. When the target memory is in a busy state at step 106, the controller must wait for a long period until the target memory returns to an idle state and can receive new commands from the controller. When the controller is waiting for the target memory, the controller cannot process subsequent commands sent by a host, resulting in a long execution delay of access commands from the host, thereby degrading the performance of the data storage device. A data access method is therefore required, which decreases delay time for executing access commands sent by a host.

BRIEF SUMMARY OF THE INVENTION

The invention provides a data access method of a memory device. In one embodiment, the memory device comprises a plurality of memories. First, a plurality of commands sequentially received from a host is stored in a command queue. A target command is then retrieved from the command queue. A target memory accessed by the target command is then determined. Whether the target memory is in a busy state is then determined. When the target memory is not in a busy state, access operations requested by the target command are then performed. When the target memory is in a busy state, a substitute command is selected from a plurality of subsequent commands stored in the command queue and access operations requested by the substitute command are performed, wherein the sequence of the subsequent commands in the command queue is subsequent to the target command.

The invention also provides a memory device. In one embodiment, the memory device is coupled to a host, and comprises a plurality of memories and a controller. The memories store data. The controller stores a plurality of commands sequentially received from the host in a command queue, retrieves a target command from the command queue, determines a target memory accessed by the target command, determines whether the target memory is in a busy state, performs access operations requested by the target command when the target memory is not in a busy state, and selects a substitute command from a plurality of subsequent commands stored in the command queue and performs access operations requested by the substitute command when the target memory is in a busy state, wherein the sequence of the subsequent commands in the command queue is subsequent to the target command.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 4 is a schematic diagram of an embodiment of execution of a plurality of commands stored in the command queue according to the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
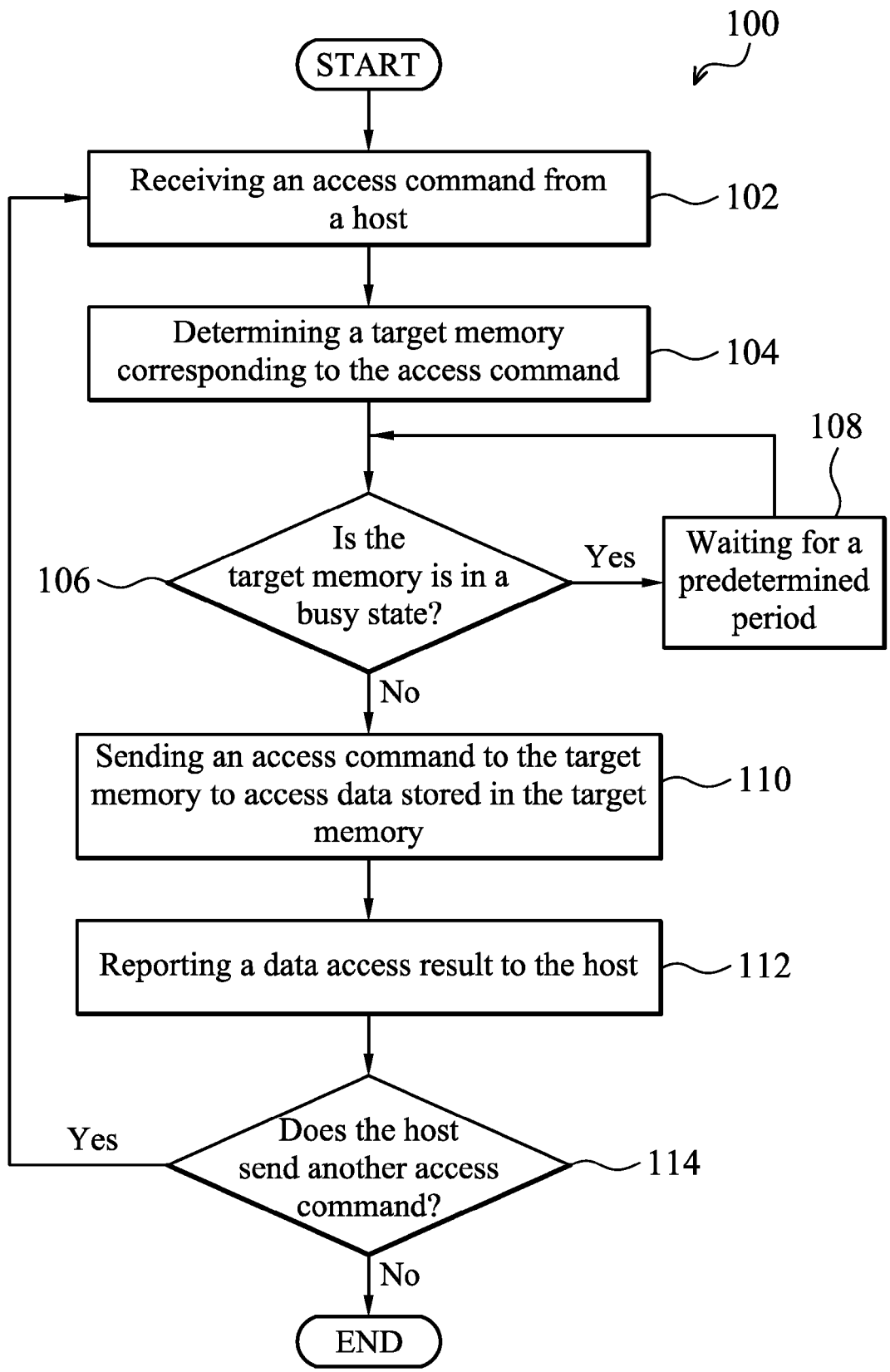
FIG. 1 is a flowchart of a conventional data access method for a controller of a flash memory device.
Figure 2:
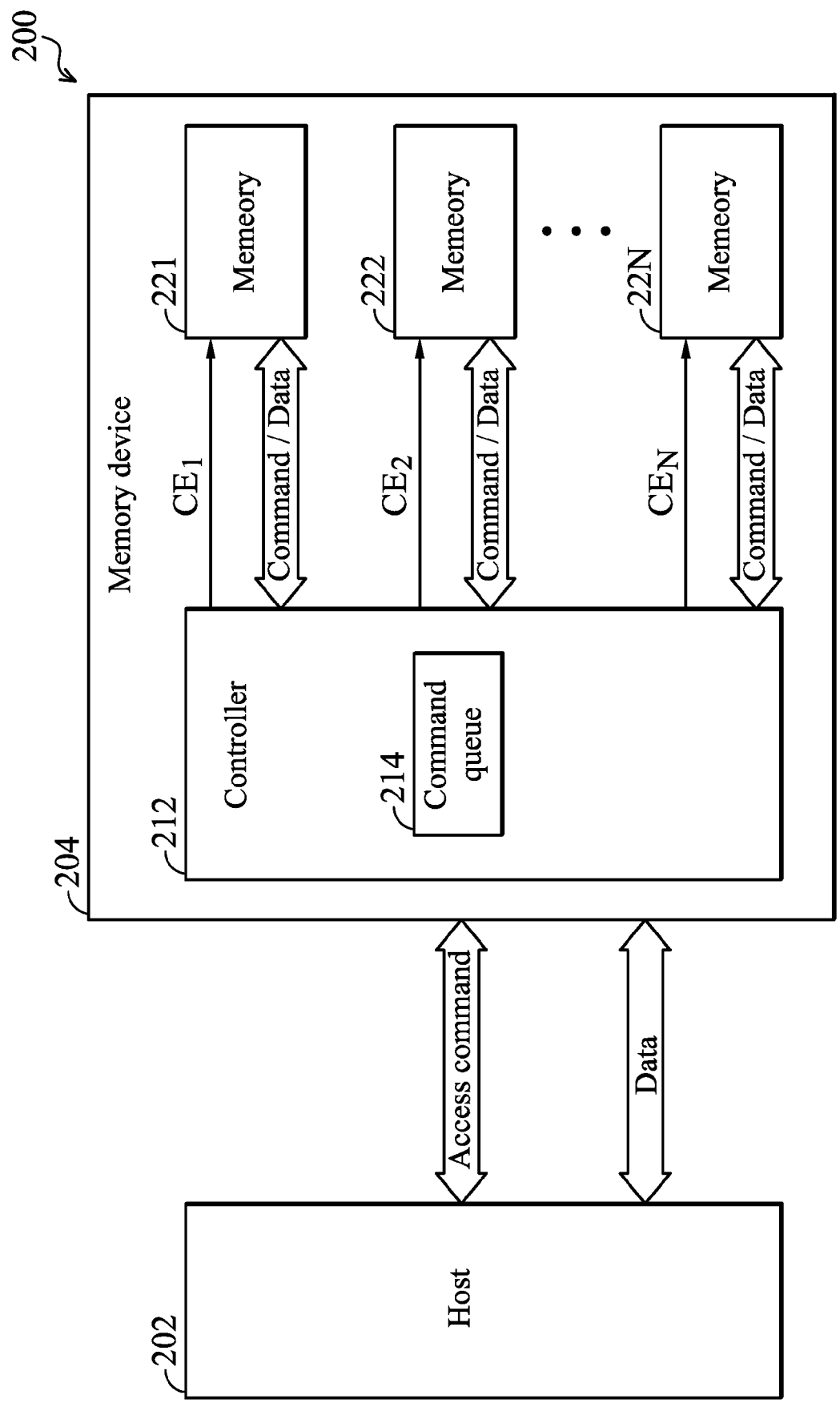
FIG. 2 is a block diagram of a data storage system according to the invention.

Referring to FIG. 2, a block diagram of a data storage system 200 according to the invention is shown. The data storage system 200 comprises a host 202 and a memory device 204. The host 202 supports a native command queue (NCQ) function. In one embodiment, the memory device 204 comprises a controller 212 and a plurality of memories 221~22N. In one embodiment, the memories 221~22N are flash memories. The controller 212 comprises a command queue 214. When the controller 212 receives a plurality of commands from the host 202, the controller 212 first stores the commands in the command queue 214. The controller 212 then sequentially retrieves the commands from the command queue 214, and then sends the commands to corresponding memories for the corresponding memories to access data. The commands may be read commands requesting the memories to read data therefrom or write commands requesting the memories to write data thereto. In one embodiment, a plurality of chip enable signals $CE_1, CE_2, \ldots, CE_N$ are respectively sent from the controller 212 to the memories 221-22N. The chip enable signals $CE_1, CE_2, \ldots, CE_N$ respectively indicate whether the corresponding memories 221, 222, ..., 22N are in a busy state.

Figure 3A:
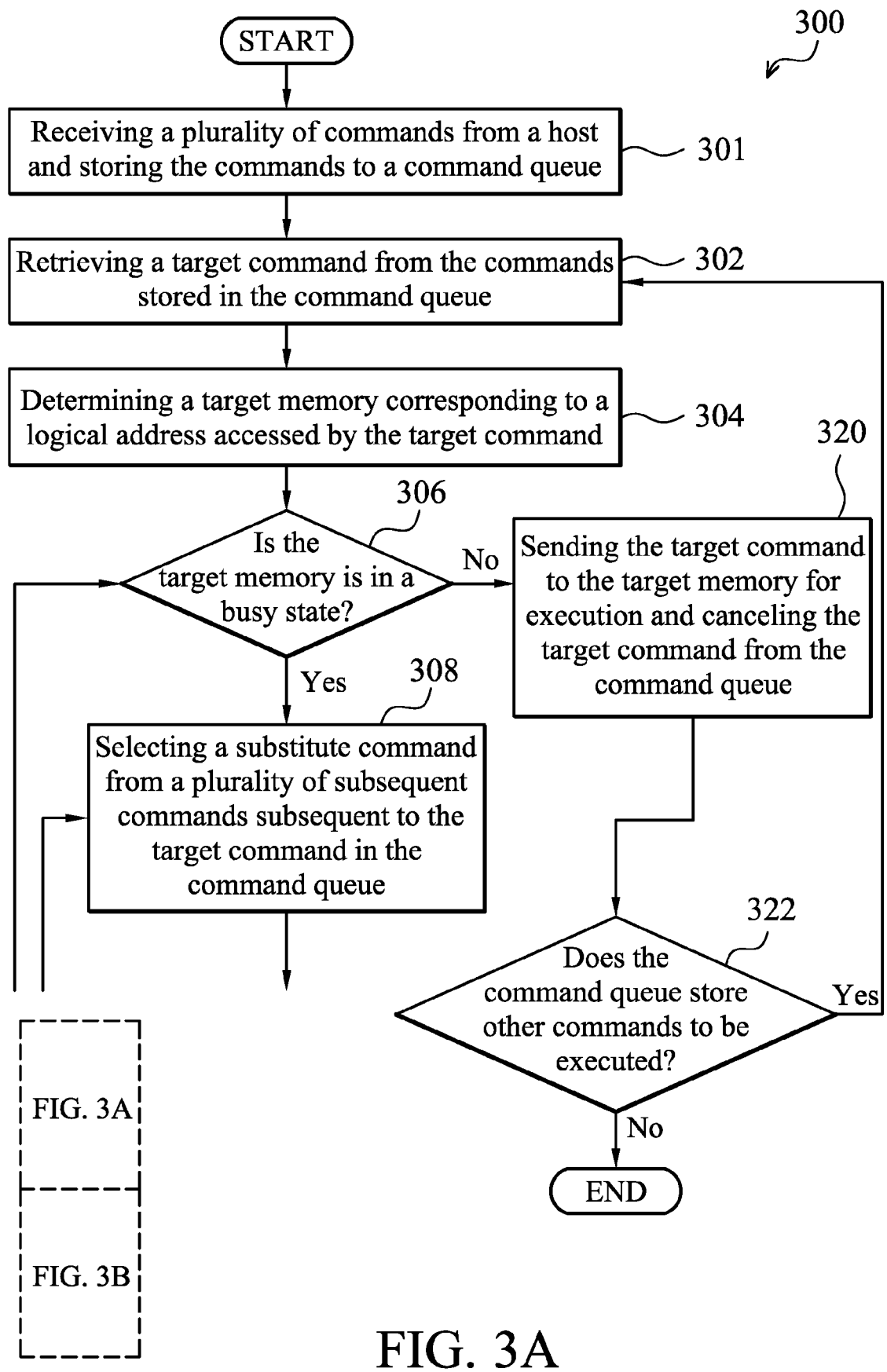
FIG. 3 is a flowchart of a data access method of a memory device according to the invention.
Figure 3B:
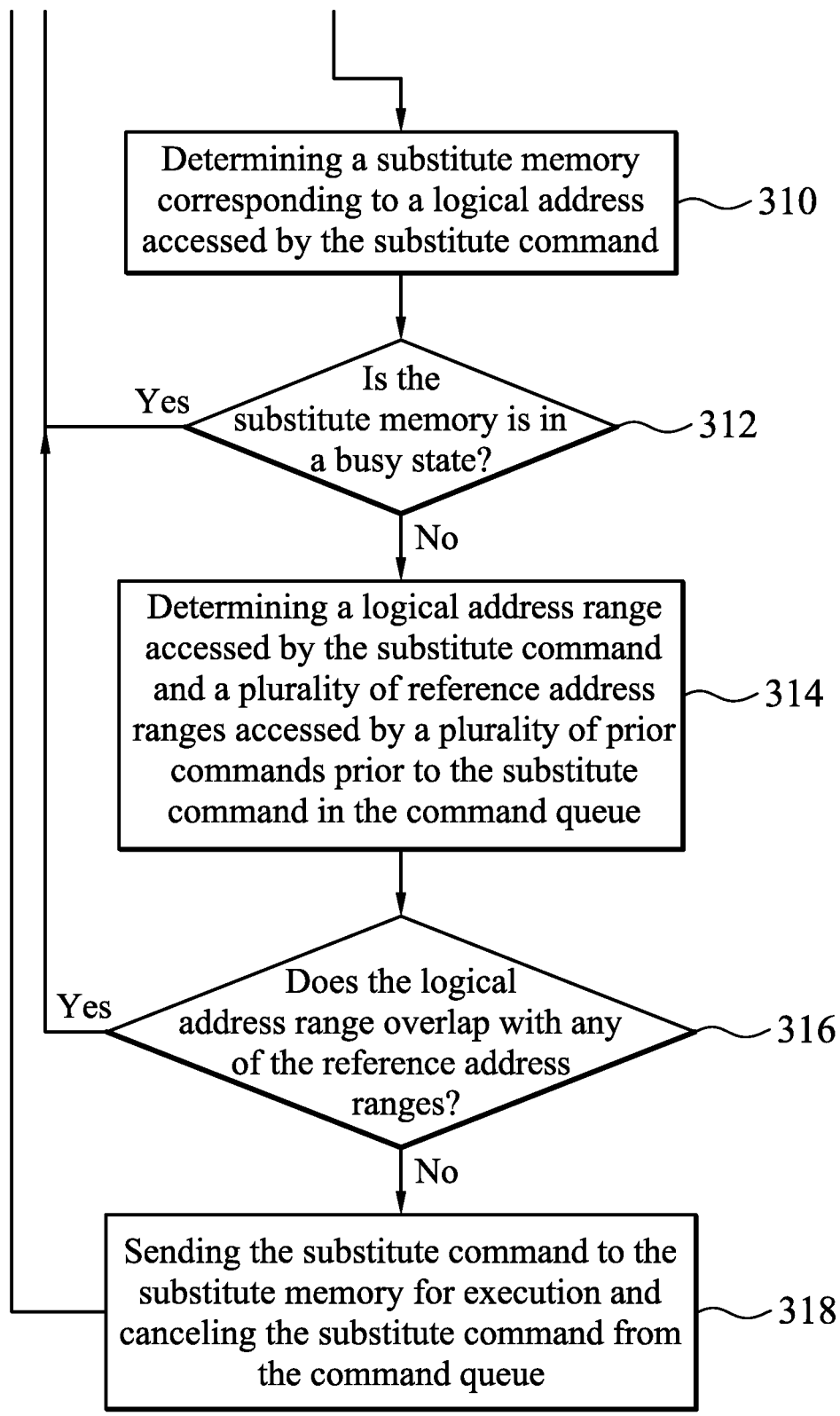

Referring to FIG. 3, a flowchart of a data access method 300 of a memory device 204 according to the invention is shown. The controller 212 processes commands received from the host 202 according to the method 300 to access data stored in the memories 221~22N. First, the controller 212 receives a plurality of commands from the host 202, and stores the commands to a command queue 214 (step 301). The controller 212 then retrieves a target command from the commands stored in the command queue 214 (step 302). In one embodiment, the target command has a first sequence in comparison with the other commands stored in the command queue 214. The controller 212 then determines a target memory accessed by the target command (step 304). In one embodiment, the controller 212 first determines a logical address accessed by the target command, and then determines the target memory to be the memory corresponding to the logical address.

After the target memory is determined, the controller 212 determines whether the target command is in a busy state (step 306). When the target memory is busy integrating or moving data stored therein, the target memory cannot receive new data and new commands from the controller 212. In one embodiment, the controller 212 checks the value of a chip enable signal corresponding to the target memory to determine whether the target memory is in a busy state. If the chip enable signal is enabled, the controller 212 determines that the target memory is not in a busy state. If the chip enable signal is disabled, the controller 212 determines that the target memory is in a busy state.

When the controller 212 determines that the controller 212 is in a busy state (step 306), the target memory cannot receive new commands from the controller 212. The host 202, however, still continues to send new commands to the memory device 204. If the controller 212 just waits for the idle state of the target memory and cannot process subsequent commands received from the host 202, a long delay period is caused in processing of subsequent commands, and performance of the memory device 204 is degraded. The controller 212 therefore selects a substitute command from a plurality of subsequent commands subsequent to the target command in the command queue 214 (step 308), and executes the substitute command instead of the target command, thus reducing an idle period of the controller 212.

After the controller 212 selects the substitute command from the commands stored in the command queue 214, the substitute command may not be suitable for execution. If the selected substitute command is not suitable for execution, the controller 212 must select a new substitute command from the commands stored in the command queue 214. Two criteria are used in selection of the substitute command. The controller 212 first determines a substitute memory corresponding to a logical address accessed by the substitute command (step 310), and then determines whether the substitute memory is in a busy state (step 312). In one embodiment, the controller 212 checks the value of a chip select signal corresponding to the substitute memory to determine whether the substitute memory is in a busy state. If the substitute memory is in a busy state (step 312), the substitute memory cannot receive new commands from the controller 212 as the target memory, and the controller 212 therefore must select a new substitute command again from the commands stored in the command queue 214 (step 308).

In addition, the controller 212 must determine whether a logical address range accessed by the substitute command overlap with a logical address ranges accessed by other commands prior to the substitute command in the command queue 214. The controller 212 first determines a logical address range accessed by the substitute command, and then determines a plurality of reference address ranges accessed by a plurality of prior commands prior to the substitute commands in the command queue 214 (step 314). In one embodiment, the controller 212 first determines a start logical address accessed by the substitute command, determines a data length corresponding to data amount accessed by the substitute command, adds the data length to the start logical address to obtain an end logical address, and determines the logical address range to be a range from the start logical address to the end logical address. The reference address ranges of the prior commands can be obtained in a similar way as the logical address range of the substitute command. The controller 212 then compares the logical address range accessed by the substitute command with the reference address ranges. If the logical address range accessed by the substitute commands overlap with any of the reference address ranges, execution of the substitute command causes errors in the data accessed by the prior commands, and the controller 212 therefore must select a new substitute command again from the commands stored in the command queue 214 (step 308).

When the substitute commands meet the criterion of steps 312 and 316, advancing execution order of the substitute commands will not lead to data errors. The controller 212 therefore sends the substitute command to the substitute memory to request the substitute memory to access data according to the substitute command (step 318). The controller 212 then cancels the substitute command from the command queue 214. The controller 212 then determines whether the target memory is still in a busy state (step 306). If the target memory is still in a busy state, the controller 212 selects a new substitute command from the commands stored in the command queue (step 308), checks whether advancing execution of the new substitute command will lead to data errors according to steps 310~316, and performs data access operations of the new substitute command (step 318).

Otherwise, if the target memory is not in a busy state (step 306), the controller 212 sends the target command to the target memory to request that the target memory access data (step 320). The controller 212 then cancels the target command from the command queue 214. Finally, the controller 212 determines whether the command queue 214 contains stored commands waiting to be executed (step 322). Because the controller 212 cancels a command from the command queue 214 after the command is executed, the commands stored in the command queue 214 have not been executed by the controller 212. When the command queue 214 contains stored commands, the controller 212 retrieves a new target command from the commands stored in the command queue 214 (step 302) and then processes the new target command according to steps 304~322. When the command queue 214 does not contain any stored commands, it means that all commands sent from the host 202 have been executed.

Referring to FIG. 4, a schematic diagram of an embodiment of execution of a plurality of commands stored in the command queue 214 according to the invention is shown. Assume that the memory device 204 comprises four memories. A first memory stores data with a logical address range from 1~5000. A second memory stores data with a logical address range from 5001~10000. A third memory stores data with a logical address range from 10001~15000. A fourth memory stores data with a logical address range from 15001~20000. The command queue 214 stores K commands. The controller 212 first retrieves a read command with a first execution order from the command queue 214 as a target command. The starting logical address of the target command is 1001 which corresponds to the first memory. If the first memory is in a busy state, the controller 212 then retrieves a write command with a second execution order from the command queue 214 as a substitute command. The starting logical address of the substitute command is 7501, which corresponds to the second memory. If the second memory is not in a busy state, the controller 212 sends the write command with the second execution order to the second memory. After the second memory writes data according to the write command, the controller 212 then sends the read command with the first execution order to the first memory, and then cancels the read command with the first execution order and the write command with the second execution order from the command queue 214.

The controller 212 then retrieves a read command with a third execution order from the command queue 214 as a target command. The starting logical address of the target command is 10001, which corresponds to the third memory. If the third memory is in a busy state, the controller 212 then retrieves a write command with a fourth execution order from the command queue 214 as a substitute command. The starting logical address of the substitute command is 9001 which corresponds to the second memory. The logical address range accessed by the substitute command, however, is 9001~10500 which overlaps with the logical address range 10001~11000 accessed by the target command. Thus, data access errors occur in the overlapped address range. The controller 212 therefore retrieves a read command with a fifth execution order from the command queue 214 as a new substitute command. The starting logical address of the new substitute command is 17501, which corresponds to the fourth memory. If the fourth memory is not in a busy state, the controller 212 sends the read command with the fifth execution order to the fourth memory, and then sends the read command with the third execution order to the third memory. After the fourth memory and the third memory read data according to the read commands, the controller 212 sends the write command with the fourth execution order to the second memory, and then cancels the read command with the third execution order, the write command with the fourth execution order, and the read command with the fifth execution order from the command queue 214.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data access method of a memory device, wherein the memory device comprises a plurality of memories, comprising:

storing a plurality of commands sequentially received from a host in a command queue;

retrieving a target command from the command queue;

determining a target memory accessed by the target command;

determining whether the target memory is in a busy state;

when the target memory is not in a busy state, performing access operations requested by the target command; and when the target memory is in a busy state, selecting a substitute command from a plurality of subsequent commands stored in the command queue and performing access operations requested by the substitute command, wherein the sequence of the subsequent commands in the command queue is subsequent to the target command, wherein selection of the substitute command comprises:

selecting a candidate substitute command from the subsequent commands stored in the command queue;

determining a candidate memory accessed by the candidate substitute command;

when the candidate substitute memory is not in a busy state, determining the substitute command to be the candidate substitute command; and when the candidate substitute memory is in a busy state, selecting a new candidate substitute command from the subsequent commands stored in the command queue as a candidate of the substitute command, and wherein selection of the substitute command further comprises:

determining a logical address range accessed by the candidate substitute command;

determining a plurality of reference address ranges accessed by a plurality of prior commands stored in the command queue, wherein the sequence of the prior commands in the command queue is prior to the substitute command;

determining whether the logical address range overlaps with the reference address ranges;

when the logical address range does not overlap with any of the reference address ranges, determining the substitute command to be the candidate substitute command; and when the logical address range overlaps with any of the reference address ranges, selecting a new candidate substitute command from the subsequent commands stored in the command queue as a candidate of the substitute command.

2. The data access method as claimed in claim 1, wherein determination of the logical address range comprises:

determining a start logical address accessed by the candidate substitute command;

determining a data length accessed by the candidate substitute command;

adding the data length to the start logical address to obtain an end logical address; and determining the logical address range to be a range from the start logical address to the end logical address.

3. The data access method as claimed in claim 1, wherein determination of the target memory comprises:

determining a start logical address accessed by the target command;

converting the start logical address to a physical address; and determining the target memory to be a memory corresponding to the physical address.

4. The data access method as claimed in claim 1, wherein each of the memories has a corresponding chip enable signal, and determination of whether the target memory is in a busy state comprises:
determining a target chip enable signal corresponding to the target memory;
checking whether the target chip enable signal is enabled; and
when the target chip enable signal is not enabled, determining the target memory is in a busy state.

5. The data access method as claimed in claim 1, wherein performing access operations requested by the target command comprises:
sending the target command to the target memory so that the target memory accesses data according to the target command;
reporting a data access result to the host; and
deleting the target command from the command queue.

6. The data access method as claimed in claim 1, wherein the memories of the memory device are flash memories.

7. A memory device, coupled to a host, comprising:
a plurality of memories, for storing data; and
a controller, storing a plurality of commands sequentially received from the host in a command queue, retrieving a target command from the command queue, determining a target memory accessed by the target command, determining whether the target memory is in a busy state, performing access operations requested by the target command when the target memory is not in a busy state, and selecting a substitute command from a plurality of subsequent commands stored in the command queue and performing access operations requested by the substitute command when the target memory is in a busy state, wherein the sequence of the subsequent commands in the command queue is subsequent to the target command,
wherein the controller selects a candidate substitute command from the subsequent commands stored in the command queue, determines a candidate memory accessed by the candidate substitute command, determines whether the candidate substitute memory is in a busy state, determines the substitute command to be the candidate substitute command when the candidate substitute memory is not in a busy state, and selects a new candidate substitute command from the subsequent commands stored in the command queue as a candidate of the substitute command when the candidate substitute memory is in a busy state, thus completing selection of the substitute command, and
wherein the controller further determines a logical address range accessed by the candidate substitute command, determines a plurality of reference address ranges accessed by a plurality of prior commands stored in the command queue, determines whether the logical address range overlaps with the reference address ranges, determines the substitute command to be the candidate substitute command when the logical address range does not overlap with any of the reference address ranges, and selects a new candidate substitute command from the subsequent commands stored in the command queue as a candidate of the substitute command when the logical address range overlaps with any of the reference address ranges, wherein the sequence of the prior commands in the command queue is prior to the substitute command.

8. The memory device as claimed in claim 7, wherein the controller determines a start logical address accessed by the candidate substitute command, determines a data length accessed by the candidate substitute command, adds the data length to the start logical address to obtain an end logical address, and determines the logical address range to be a range from the start logical address to the end logical address, thus completing determination of the logical address range.

9. The memory device as claimed in claim 7, wherein the controller determines a start logical address accessed by the target command, converts the start logical address to a physical address, and determines the target memory to be a memory corresponding to the physical address, thus completing determination of the target memory.

10. The memory device as claimed in claim 7, wherein each of the memories has a corresponding chip enable signal, and the controller determines a target chip enable signal corresponding to the target memory, checks whether the target chip enable signal is enabled, and determines the target memory is in a busy state when the target chip enable signal is not enabled.

11. The memory device as claimed in claim 7, wherein the controller sends the target command to the target memory so that the target memory accesses data according to the target command, reports a data access result to the host, and deletes the target command from the command queue, thus performing the access operations requested by the target command.

* * * * *